Figure 1A:
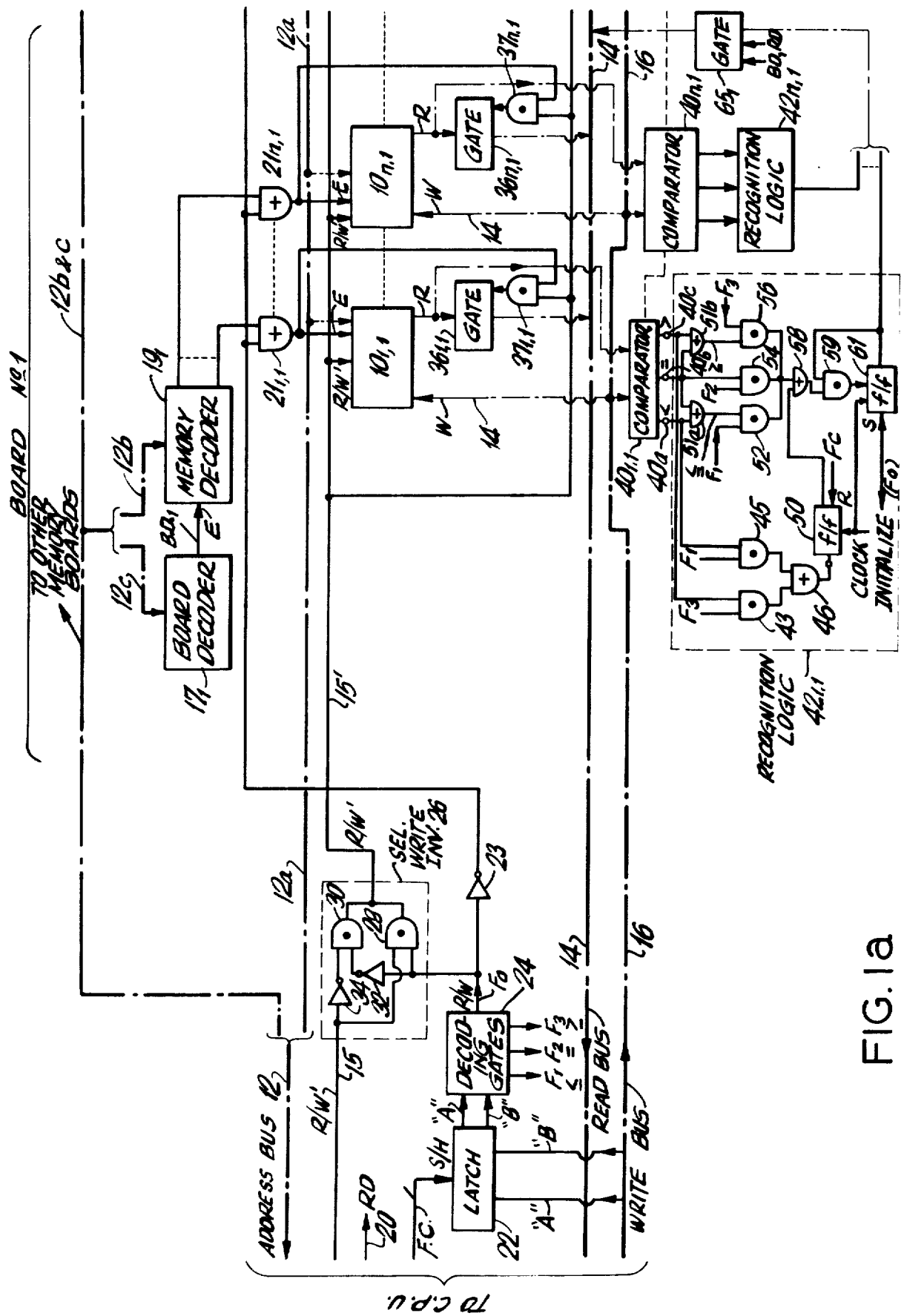

United States Patent [19]

Lamb

[11] 4,144,564

[45] Mar. 13, 1979

[54] ASSOCIATIVE MEMORY

[75] Inventor: Sydney M. Lamb, North Haven, Conn.

[73] Assignee: Semionics Associates, Berkeley, Calif.

[21] Appl. No.: 788,797

[22] Filed: Apr. 19, 1977

[51] Int. Cl.$^2$ ............................................. G06F 7/34
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,349,375 | 10/1967 | Seeber et al. | 340/172.5 |
| 3,648,254 | 3/1972 | Beausoleil | 340/172.5 |
| 3,771,140 | 11/1973 | Tromp | 340/172.5 |
| 3,896,419 | 7/1975 | Lange et al. | 340/172.5 |
| 3,958,222 | 5/1976 | Messina et al. | 340/172.5 |

Primary Examiner—Gareth D. Shaw
Assistant Examiner—C. T. Bartz
Attorney, Agent, or Firm—Stephen B. Judlowe

[57] ABSTRACT

An improved associative memory employs plural separately addressable memories, e.g., random access memories (RAMs), which may be written into, or read from in conventional fashion. In a recognition mode, information is read from differing memory locations, and compared with an operand supplied on a data bus by a central processing unit (CPU), comparator apparatus being common for an array of storage locations. The comparison results, determined in accordance with a CPU-specified criterion, are then communicated back to the processor.

13 Claims, 4 Drawing Figures

ASSOCIATIVE MEMORY

DISCLOSURE OF INVENTION

This invention relates to electronic data processing apparatus and, more specifically to an improved associative memory.

In many data processing applications of current day interest, an array of stored information must be sorted, or a subset of entries selected, based upon specific criteria. Illustrative such applications are to select entries from an array based upon zip code, income, name, family composition, employment history, skills, technical results, size or the like. Such criteria may require an exact match (e.g., age=49), or an inequality (age under 49, or at least 49).

Such data processing is often done on a software basis in a central processor itself under stored program control, i.e., where a possibly relevant file entry is fetched to CPU (core) memory, and compared with an operand pursuant to the obtaining criteria. Alternatively, the recognition function may be implemented on a hardware rather than a software basis, with the usual speed advantage-cost disadvantage tradeoff vis-a-vis software data processing. However, such prior art associative memories have heretofore been complex and expensive, employing bit-by-bit combined storage and comparison structure.

It is thus an object of the present invention to provide an improved associative memory.

More specifically, it is an object of the present invention to provide an improved associative memory where a relatively large amount of information stored in a memory, of either the random access or serial type, may be examined in conjunction with a then obtaining, changeable match or recognition criterior and operand data, employing a relatively small amount of comparison hardware equipment.

It is a further object of the present invention to provide an associative memory which may be relatively simple and inexpensively constructed, and readily employed.

The above and other objects of the present invention are realized in a specific, illustrative recognition or associative memory employing a plurality of memory modules, e.g., of the random access type (RAM). The RAMs may be interrogated or written into a per se conventional manner. During a recognition mode operation, information from a subset or all of the addresses in any RAM are read out seriatim (RAM parallel) under central processor unit (CPU) control at locations specified by an address bus. The information so derived is examined by comparator apparatus common to plural storage locations which determines whether or not the criterion employed is satisfied. In accordance with varying aspects of the present invention, the criterion may require an exact match, or to characterize data in accordance with varying inequality relationships. The comparator output signals are then batched and supplied to the CPU for further processing.

Figure 1B:
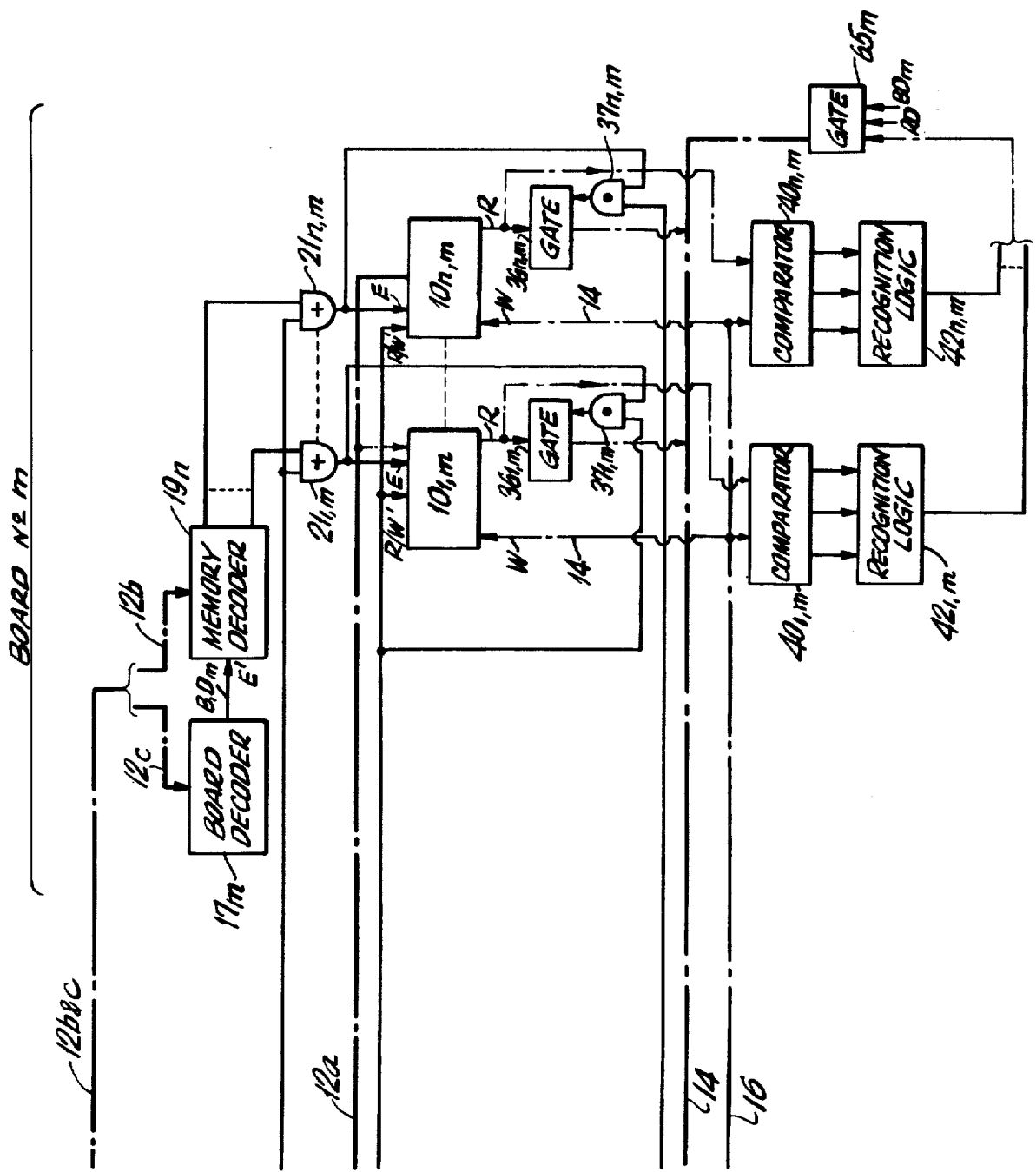
Figure 2A:
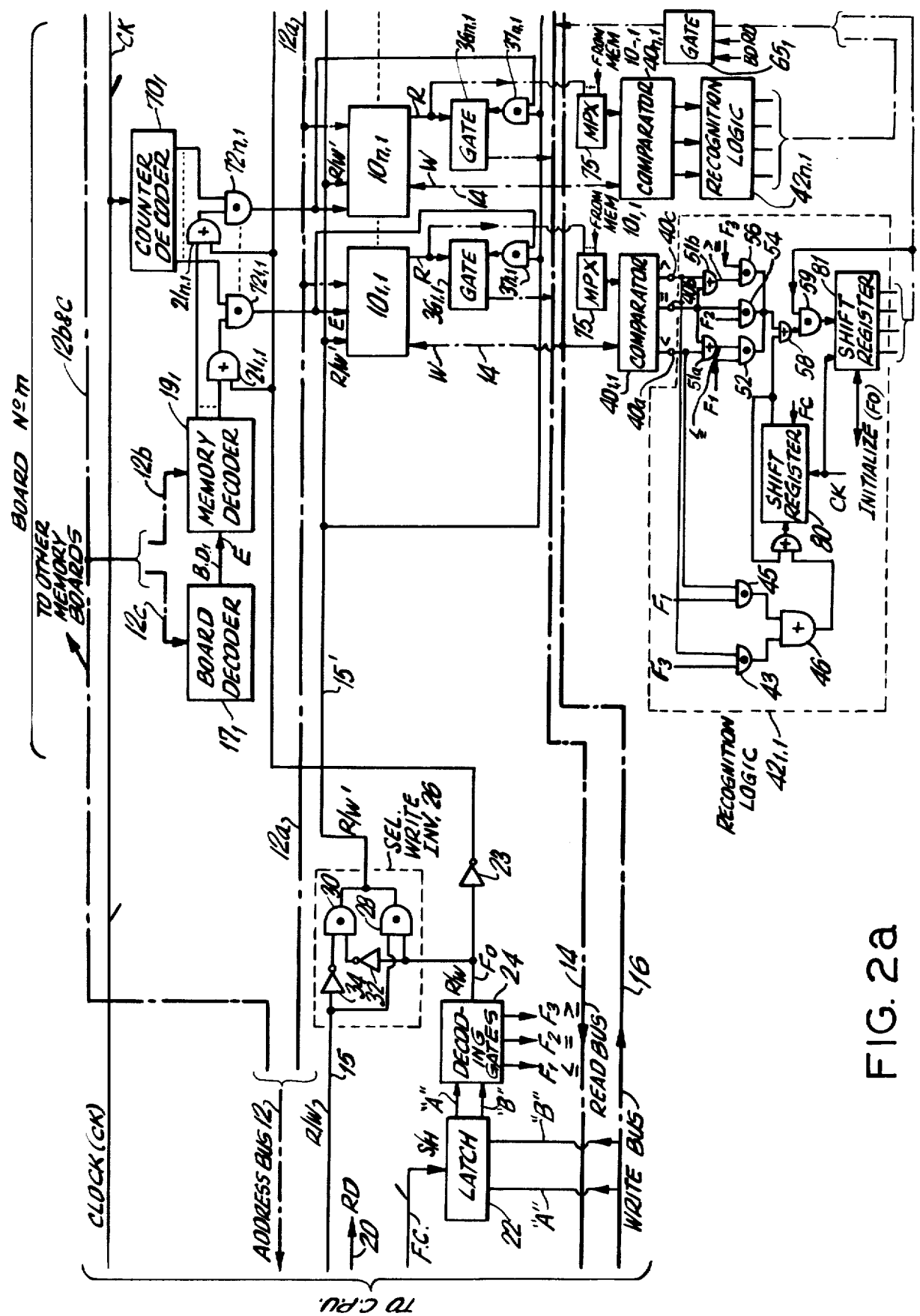
Figure 2B:
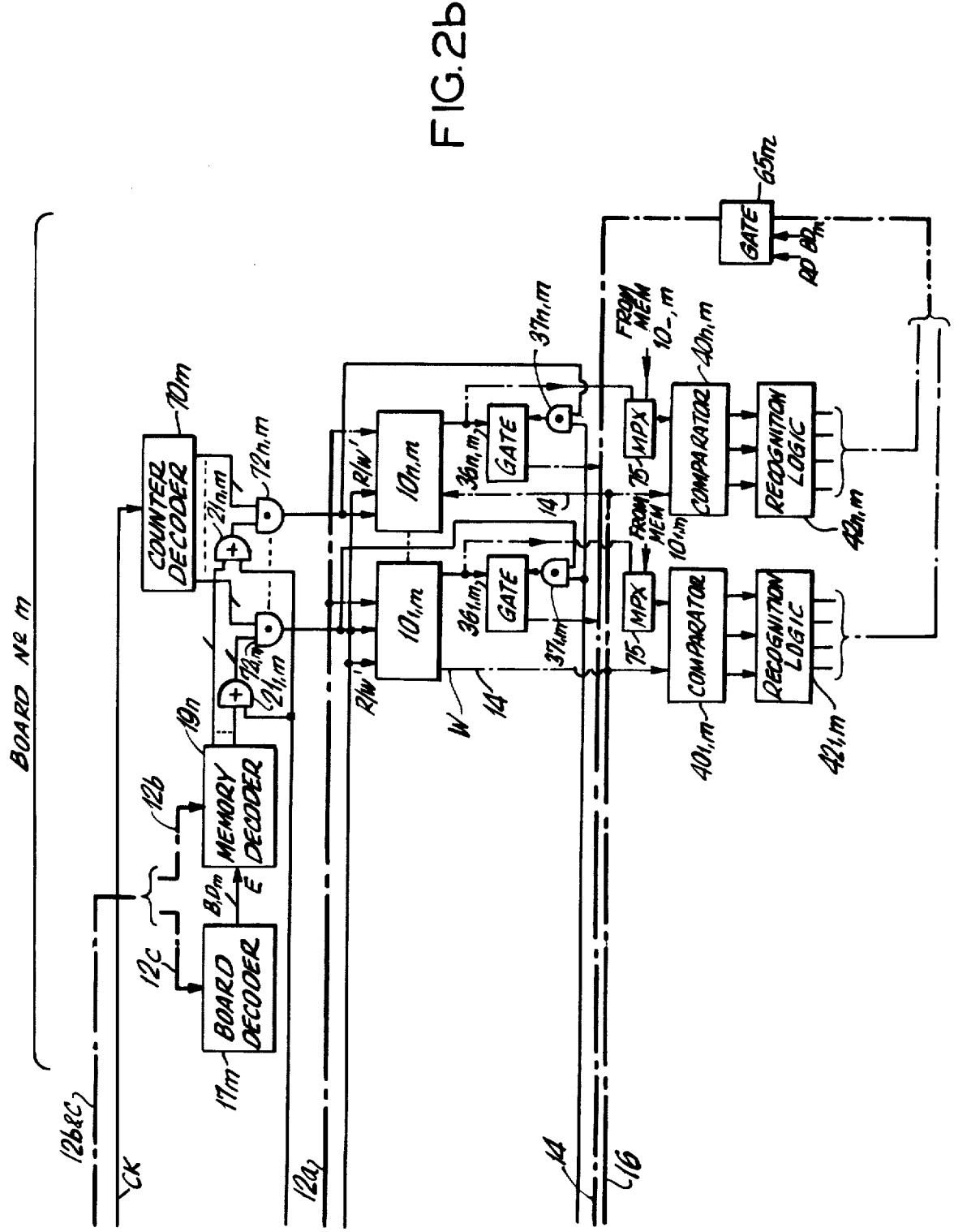

The above and other features and advantages of the present invention will become more clear from the following detailed description of specific, illustrative embodiments thereof, presented hereinbelow in conjunction with the accompanying drawings, in which:

FIGS. 1A and 1B are the left and right portions of a schematic diagram of a first illustrative association memory in accordance with the principles of the present invention; and FIGS. 2A and 2B are the left and right portions of a diagram which schematically depicts a second REM embodiment in accordance with the present invention.

Referring now to FIGS. 1A and 1B, hereinafter referred to collectively as composite FIG. 1, there is shown an improved associative memory embodying the principles of the present invention adapted for use in data processing equipment (e.g., under control of a conventional central processing unit such as a microprocessor, minicomputer, or general or special purpose digital computer). The composite association memory shown in FIG. 1 employs a plural conductor address bus 12 for receiving address information from the CPU (where RAM memories are employed), a read bus 14 for supplying processed information to the central processing unit, and a write bus 16 for receiving information from the central processor. The read and write buses 14 and 16 may, of course, be combined.

A plurality of memory modules 10 are included in the memory. For purposes of concreteness and not limitation, it will be assumed that the memory modules 10 each comprise a random access memory (RAM) including a plurality of stage locations. Again for purposes of illustration only, it will be assumed that each $RAM_{i,j}$ of an array of RAMs is the i-th RAM located on the j-th of plural, expandable circuit boards where i and j are independent positive integers. In the FIG. 1 embodiment, associated with each RAM module $10_{i,j}$ is a comparator $40_{i,j}$ having three outputs $40a$-$40c$ connected to an associated recognition logic module $42_{i,j}$. The output of the several recognition logic modules $42_{i,j}$ are coupled by buffer (e.g., AND) gates 65 back to the read bus 14 for communication back to the central processor. As used herein, "AND" and "OR" gates will generically identify coincidence and disjunctive Boolean operations, respectively.

The CPU has conventional read/write access to each of the RAM memory modules $10_{i,j}$ for registering information therein (write operation) or for reading information therefrom (read operation) under partial control of a read/write control line 15 emanating from the CPU. In alternative data processing constructions separate read/write lines may be employed. In particular, for example to write information into a memory address, the full memory address to be accessed is loaded onto the address bus 12. The least significant address digits are impressed on address bus conductors 12a which are supplied to each of the memory modules 10 to identify one of the plural addresses in each such memory. The most significant address digits, present on address bus conductors 12c are supplied to a board decoder $17_j$ on each board, the decoder $17_j$ providing an output signal only when the address on composite address bus 12 in fact resides on the j-th board. Similarly, once enabled by the associated board decoder $17_j$, a memory module (RAM) decoder $19_j$ receives the address conductor digits on address lines 12b of intermediate significance, and enables a specific one of the memory modules $10_{i,j}$ associated with that decoder, acting through a following OR gate $21_{i,j}$. Thus, only the proper RAM 10 containing the address in which information is to be inserted is enabled by the activated output of the associated memory module decoder $19_j$ and the particular address in the RAM is then specified by the address on the least significant address bus digit conductors 12a.

Coincident with the address selecting operation, the read/write line 15 is supplied with a "write" signal which passes unchanged through a selective write signal inverter 26, a latch 22 having stored therein information specifying that a write operation was to be conducted (activated $F_o$ output). The latch 22 and following mode decoder gates 24 may simply be controlled directly by the C.P.U. via a function change (F.C.) line. Accordingly the $F_o$, or read/write (non-recognition) signalling operation output of the latch decoding gates 24 signals that a read or write (and not "recognize") operation is to occur and enables an AND gate 28 to pass the "write" signal impressed on lead 15 by the CPU unchanged to condition the selected RAM $10_{i,j}$ for a write operation. Accordingly, the selected RAM $10_{i,j}$ having been supplied with an enabling signal by decoder $19_j$ via gate $21_{i,j}$ and a particular address by the address bus portion $12_a$, simply inserts the CPU-supplied information on write bus 16 into the appropriate memory location.

A read operation occurs in a manner substantially identical with that described above with respect to a write operation. When a "read" is encountered, the output of decoding gate 24 again passes the read signal unchanged through AND gate 28 and signals the RAMs 10 that a memory read is to be effected. The read signal proximately supplied by the CPU in conductor 15 also activates bus gate 36 associated with the active, address bus 12b, 12c - selected RAM $10_{i,j}$ acting through an AND gate $37_{i,j}$ which is supplied with both the read signal, and also the RAM $10_{i,j}$ selecting signal output of the decoder $19_j$ and gate $21_{i,j}$. The particular RAM $10_{i,j}$ is again selected by the address bus constituents 12b and 12c and the decoders $19_j$ and $17_j$ in the manner discussed above with respect to a write operation while, as before, a particular address in the selected RAM is activated under the control of the least significant activated digits present on the bus constituent 12a. Such signalling prevailing, information at the specified address location of the selected RAM 10 is read out, passes through the activated associated gate $36_{i,j}$ and is impressed on the read bus 14 for communication back to the CPU.

To effect an associative memory operation of the instant invention, a particular match criterion is entered into the now F.C.-line enabled (sample mode) latch 22 via two digits "A" and "B" loaded by the CPU onto predesignated conductors of the write bus 16. Three of four possible Boolean variable combinations for the variables "A" and "B" specify whether a "less than", "equal to", or "greater than" match standard is to be employed, i.e., whether the match standard-specifying signal is present at the output $F_1$, or $F_2$, or $F_3$ output of decoding gates 24 connected to the latch. It will be appreciated that all decoding gates of the instant invention, e.g., 17, 19, 20, 24 and/or 70 (FIG. 2) may simply comprise inverters and AND gates having inputs organized to respond only when a preselected binary digit pattern is supplied thereto. The fourth possible "A" and "B" variable combination for the contents of latch 22 will excite the $F_o$ output of decoding gates 24 previously discussed, to specify that a memory read or write operation rather than a recognition operation is to be effected. Moreover, a CPU-emitted write signal present on conductor 15 will be inverted by selection write inverter 26 during any associative memory operation, since the $F_o$ output of the decoding gates 24 is in the inactive state during associative mode.

Assume now that a specific recognition function is required, e.g., that data in the memory 10 is to be compared with data on the write bus 16 to determine whether or not the two identically correspond (the "equal" match criterion identified to the apparatus by appropriately loading latch 22 with "A" and "B" variables which enable $F_2$ output from decoding gates 24). The CPU specifies an address of a particular cell in all RAMs 10 to be interrogated via the address bus portion 12a, common thereto. The RAM modules 10 are all coincidentally enabled by the $F_o$ signal inverted by element 23 (active inverted $F_o$ signalling one of the active three recognition mode functions) acting through OR gates 21. Since an associative memory function is being requested by the CPU, the CPU supplies a write signal on the read/write control conductor 15 which is inverted by inverter 34, passed by an AND gate 30 to read/write conductor 15', and impressed as a read signal on all RAMs 10. Accordingly, the information stored at the bus 12a-specified RAM address is read out from each RAM $10_{i,j}$ and is communicated to its associated comparator $40_{i,j}$, together with the operand then impressed on to the write bus 16 by the CPU. It is noted that this recognition function thus corresponds to a simple "write" command for the CPU, but which is transformed to a memory read by the selective write inverter 26.

Each comparator $40_{i,j}$ responds to the two input signals supplied thereto, one read out from the associated RAM location and the other supplied via the write bus 16, and enables one of three output terminals 40a, 40b or 40c depending upon whether the data read out from the RAM is less than, equal to, or greater than the operand on the data bus 16, respectively. The outputs of each comparator $40_{i,j}$ are supplied to an associated recognition logic circuit $42_{i,j}$, one such circuit 42 being shown in detail in FIG. 1. For the assumed case where an "equal to" operation is specified (enabled $F_2$ signal), an AND gate 54 supplied with both the $F_2$ signal and the output port 40b of the comparator will be energized if the equality condition is met, but not otherwise. Correspondingly, AND gates 52 and 56 cannot have their logical conditions satisfied when the "equal to" match criterion prevails, since their $F_1$ and $F_2$ inputs are inactive at such time. Thus, the AND gate 54 makes the recognition decision during "equal to" signal processing. Similarly, the gates 52 and 56 respectively become the decision elements when "less than or equal to" or "greater than or equal to" criteria are in force under control of the $F_1$ and $F_3$ signal outputs of latch 22 and its decoding gate 24.

An OR, disjunctive logic function is effected between the outputs of the gates 52, 54 and 56 (a wired OR being shown in the drawing) and the output passes through an OR gate 58 and AND gate 59 employed for purposes below discussed to the input of a flip-flop 61, e.g., a J-K flip-flop which is clocked (as by a clock signal derived from the memory write command) during each testing cycle. The flip-flop 61 (and thus also AND gate 59) is provisionally set at the beginning of an associative memory function (e.g., by a last obtaining read or write $F_0$ signal as desired). At the completion of a recognition cycle of operation, the state of the flip-flops 61 in the recognition logic circuits 42 may be read out on a board-by-board basis by a command on lead 20 from the C.P.U. to issue a read (RD) signal to open the gate $65_j$ on the j-th board (together with bus 12b, c furnished BD address signals), thereby connecting the ensemble of flip-flop output signals reflecting j-th board recognition results to the read bus 14 for communication to the CPU.

A further discussion will now be directed to the recognition logic circuits 42 and, in particular, with respect to the circuit $42_{11}$ shown in detail in FIG. 1. In its overall opertion as above described, the flip-flop 61 is provisionally set at the beginning of a recognition mode of operation, and is clocked each time a new recognition test is effected. If the recognition function is satisfied for the data being examined, one of the gates 52, 54 or 56 will provide an enabled output signal (depending upon which test is specified by the selected output $F_1$, $F_2$ or $F_3$ from the decoding gate 24) to continue the set state of flip-flop 61 acting through gates 58 and 59. Thus, for example, a number of stored entries in the memory 10 may correspond to different bytes of a composite informational character or record. The different bytes may thus illustratively comprise name, age, address, alphanumeric information, and the like of any kind or description. Depending upon how extensive the recognition requirement, any subset or all of the bytes of each stores record may be successively addressed and tested, such that the flip-flop 61 will remain set only if all tests are satisfied. If any one test is not satisfied, the clock at the input of the J-K flip-flop 61 where the test (recognition) operation is being effected, together with the absence of any enabled output of the AND logic 52, 54 or 56 acting through gate 58 will cause a zero to be stored in the flip-flop. The AND gate 59 assures that the flip-flop 61 will not be reset should a later recognition test succeed. This cleared state of flip-flop 61 on functional CPU reading via gate $65_j$ will advise the CPU that at least one of the comparison tests for the bytes reviewed has failed. Alternatively, if a "1" is communicated to the CPU the processor is advised that all of the tests have succeeded (a "recognition").

One other aspect of the operation of recognition logic 42 requires attention. This involves operation in a "less than or equal to" or a "greater than or equal to" mode associated with activated control signals $F_1$ or $F_3$, respectively. For example, if two numbers are being compared on a serial digit by digit basis, e.g., if a question is being asked, "is a number read out from memory (e.g., "1953") greater than or equal to the CPU-supplied number (e.g., "1945")", and the characters are examined from most to least significant, if it is once determined that a digit in the number read out from the RAM (assumed "1953") is greater than the corresponding digit in the operand comparison word (assumed "1945"), then the tested number ("1953") is greater than the operand ("1945") even if a test of a later digit fails. With particular regard to the two numbers in the illustration, once it is determined that the "5" digit in "1953" is greater than the "4" digit in "1945", then "1953" exceeds "1945" even though a succeeding digit test will fail ("3" less than "5" for the units digit).

To attend to such a logical proposition for the "greater than or equal to" case, if a comparison is made on any digit causing either output 40b or 40c of comparator $49_{11}$ to be high together with the presence of the $F_3$ control, a coincidence gate 43 and disjunctive (OR logic gate 51b and 46 set a flip-flop 50 which will thereafter provide a match signal to the flip-flop 61 through the OR gate 58 and AND gate 59 to assure that the "1" set information in flip-flop 61 is preserved notwithstanding that any later less significant digit test fails. The AND gate 59 is employed to assure that once a test on a more significant digit has failed, that a later "greater than" signal will not inadvertently restore the flip-flop 61 to its set condition. In a mode of operation similar to that described above, control signal $F_1$ operates in conjunction with the comparator outputs 40a or 40b and gates 51a, 45 and 46 to preserve a "less than or equal" recognition once obtained.

Thus the FIG. 1 arrangement has been shown by the above to provide for reading and writing into any RAM location under CPU control and, moreover, to test the stored contents at any memory location against an operand supplied on the write bus on either an equality or inequality basis.

The embodiment shown in FIG. 1 is of substantial improvement over prior art associative memories in that each comparator 40 is associated with and common to an entire array of storage locations in RAM memory. This contrasts with prior associative memories where comparison logic is employed at each storage location, thereby greatly increasing the hardware required.

An even greater hardware saving vis-a-vis the prior art arrangements is shown in the embodiment of FIGS. 2A and 2B (hereinafter referred to as composite FIG. 2) which effectively multiplexes several RAMs 10 as inputs to each comparator 40. In FIG. 2, like reference numbers vis-a-vis FIG. 1 identify like components. In the embodiment of FIG. 2 the comparators 40 are no longer in one to one correspondence with the RAMs 10, but rather each comparator 40 services a subset of the RAMs 10 included on any particular memory board. More specifically, it will be assumed that each associative memory operation required of a RAM group, e.g., a group on a circuit board, is subdivided into a plurality of sequential operations (e.g., four), and that the CPU supplies a series of clock (CK) pulses such that four clock pulses subdivide each interrogation cycle into four parts. A clock pulse modulo-4 counter-decoder 70 and gates 72 on each board effectively subdivide the array of memories $10_{i,j}$ on each board into four groups, and sequentially connect sets of four RAMs with the four comparators 40 via four multiplexers 75.

Accordingly, the outputs of the comparators 40 during each of successive clock cycles during recognition mode functioning, comprise four digits which respectively characterize the four inputs read from the four RAM locations interrogated by the CPU.

In the multiplexed embodiment of composite FIG. 2, the recognition logic 42 flip-flops 50 and 61 of the FIG. 1 arrangement are replaced by four stage shift registers 80 and 81 for the assumed modulo-4 multiplexing of the counter-decoders 70, and the comparison results developed during the four test sub-cycle portions stored in separate stages of the shift registers 80 and 81. Thus, instead of a single storage stage (flip-flops 50 and 61 in FIG. 1), each test is contained in a separate stage of the self-looping shift registers 80 and 81. At the completion of a recognition mode operation, the recognition result information in the shift register 81 stages are gated out by the gate 65 for communication to the CPU by way of the read bus 14. That is, rather than having n separate outputs on a one-each basis from flip-flops 61 in the FIG. 1 arrangement, the requisite n signals are present at the n parallel outputs of plural shift register stages 81. Similarly, the four stage shift register 80 preserves a recognition once made for data read from a particular, associated, RAM for an inequality mode operation.

The associative memories of FIGS. 1 and 2 have thus been shown by the above to permit all read, write and recognition functions required thereof and, moreover, to do so in an improved manner providing for an efficient use of comparator hardware, processsing logic and the like.

The above described arrangements are merely illustrative of the principles of the present invention. Numerous modifications and adaptations thereof will be readily apparent to those skilled in the art without departing from the spirit and scope of the present invention. Thus, for example, while the above described arrangements have been discussed in terms of the memories 10 comprising random access units (RAMs), the memories 10 may as well be implemented by serial or circulating memories, e.g., of charge coupled device construction. Clocking from CPU (or locally generated), as via a clocking bus comparable to that shown in FIG. 2, is employed to cycle the memory such that memory contents can then be compared on the fly in the several comparators 40. Also, the conceptually distinct RAMs of FIG. 2 may in fact be implemented by distinct portions of one or more larger RAMs.

What is claimed is:

1. In combination in an associative memory, a plurality of random access memory modules each including plural information storage addresses, plural comparator means, means connecting each of said comparator means to a different one of said random access memory modules for receiving information read out therefrom, data bus means connected to each of said memory modules and each of said comparator means for supplying information to and receiving information from said random access memory modules during memory write and read operations, respectively and supplying match information to said plural comparator means during associative memory operation, memory accessing means including common address bus means connected to said memory modules, each of said comparator means including means for comparing the information supplied thereto by said associated memory module with information present on said data bus means and for developing an output signal representing the results of said comparison, and means for storing said output result signals of said comparator means, wherein each of said random access memory modules comprises read and write control port means, read-write control means connected to said read-write control port means of said random access memory modules, and means for selectively inverting a write command supplied by said read-write control means to thereby impress a read command at said read-write control port means of said memory modules.

2. A combination as in claim 1 further comprising read gate means connecting the output of each random access memory module with said data bus means.

3. A combination as in claim 1 further comprising recognition logic means and comparison gate means serially connecting said comparator means with said data bus means.

4. A combination as in claim 3 wherein said comparator means comprises means for producing an output signal specifying whether or not the information supplied thereto from an associated random access memory module is equal to data present on said data bus means connected thereto, and where said storing means comprises bistable means connected to said comparator means for registering therein the comparison results produced by said comparator means.

5. A combination as in claim 1 wherein said random access memory modules are subdivided into subsets, and wherein said memory accessing means includes plural address decoding means each associated with a different random access memory modular subset connected to and responsive to said common address but means for selectively enabling a selected one of said random access memory modules in said random access memory subset associated therewith.

6. A combination as in claim 1, further comprising operational mode means connected to at least said address bus for registering therein whether a read or write, or an associative memory function is required, said selective inverting means being connected to said operational mode means for selectively inverting a write command depending upon the state of said mode means.

7. A combination as in claim 1 further comprising central processor means connected to said data bus means and said memory accessing means.

8. A combination as in claim 7 wherein said data bus means includes separate read and write buses.

9. A combination as in claim 1 further comprising means for coupling the comparison result signals stored in said storing means to said data bus means.

10. A combination as in claim 1 further comprising associative mode signaling means connected to said plural random access memory modules for coincidentally enabling said plural random access modules.

11. In combination in an associative memory, a plurality of memory modules each including plural information storage addresses, plural comparator means, means connecting each of said comparator means to a different one of said memory modules for receiving information read out therefrom, data bus means connected to each of said memory module, and each of said comparator means for supplying information to and receiving information from said random access memory modules during memory write and read operations, respectively, and supplying match information to said comparator means during associative memory operation, common address bus means connected to said memory modules having thereon a memory address, each of said comparator means including means for comparing the information supplied thereto from said associated memory module with information present on said data bus means and for developing an output signal representing the results of said comparison, means for storing said output result signals of said comparator means, and means for coupling the comparison result signals stored in said storing means to said data bus means, said storing means including recognition logic means, wherein each of said random access memory modules comprises read and write control port means, read-write control conductor means connected to said read-write control port means of said random access memory modules, and means for selectively inverting a write command on said read-write control conductor means to thereby impress a read command on said read-write conductor means.

12. A combination as in claim 2 wherein said comparator means comprises means for producing an output signal specifying whether or not the information supplied thereto from an associated memory module is equal to data present on said data bus means connected thereto, and where said storing means comprises bistable means connected to said comparator means for registering therein the comparison results produced by said comparator means.

13. A combination as in claim 11 further comprising associative mode signaling means connected to said plural random access memory modules for coincidentally enabling said plural random access memory modules.

* * * * *